US009904642B2

(12) United States Patent
Chou et al.

(10) Patent No.: US 9,904,642 B2
(45) Date of Patent: Feb. 27, 2018

(54) DETECTION CIRCUIT OF UNIVERSAL SERIAL BUS

(71) Applicants: Yi-Chung Chou, Taipei (TW); Dong-Shan Chen, Hsinchu County (TW); Chih-Chieh Wu, Taoyuan (TW)

(72) Inventors: Yi-Chung Chou, Taipei (TW); Dong-Shan Chen, Hsinchu County (TW); Chih-Chieh Wu, Taoyuan (TW)

(73) Assignee: ITE TECH. INC., Hsinchu (TW)

( * ) Notice: Subject to any disclaimer, the term of this patent is extended or adjusted under 35 U.S.C. 154(b) by 218 days.

(21) Appl. No.: 14/887,263

(22) Filed: Oct. 19, 2015

(65) Prior Publication Data

US 2017/0017598 A1  Jan. 19, 2017

(30) Foreign Application Priority Data

Jul. 14, 2015 (TW) .............................. 104122791 A

(51) Int. Cl.
| | |
|---|---|
| *G06F 11/30* | (2006.01) |
| *G06F 13/20* | (2006.01) |
| *G06F 13/40* | (2006.01) |
| *G06F 13/42* | (2006.01) |

(52) U.S. Cl.
CPC ...... *G06F 13/4022* (2013.01); *G06F 11/3051* (2013.01); *G06F 13/4282* (2013.01); *G06F 11/3027* (2013.01); *G06F 11/3041* (2013.01); *G06F 13/20* (2013.01); *G06F 13/4068* (2013.01)

(58) Field of Classification Search
CPC .. G06F 13/20; G06F 13/4022; G06F 13/4068; G06F 13/4282; G06F 11/3027; G06F 11/3041; G06F 11/3051
See application file for complete search history.

(56) References Cited

U.S. PATENT DOCUMENTS

| | | | |
|---|---|---|---|
| 9,625,988 B1* | 4/2017 | Agarwal | G06F 1/3296 |
| 2015/0261714 A1* | 9/2015 | Talmola | G06F 13/4081 |
| | | | 710/313 |
| 2015/0362984 A1* | 12/2015 | Waters | G06F 1/3287 |
| | | | 713/324 |
| 2016/0308452 A1* | 10/2016 | Motoki | H02M 3/33523 |
| 2016/0352232 A1* | 12/2016 | Chang | G06F 1/266 |

OTHER PUBLICATIONS

Universal Serial Bus Type-C Cable and Connector Specification, Rev 1.0; Aug. 11, 2014; p. 48, 113, 151, 152, and 169.*

* cited by examiner

*Primary Examiner* — Eric T Oberly
(74) *Attorney, Agent, or Firm* — JCIPRNET

(57) ABSTRACT

A detection circuit of Universal Serial Bus (USB) is provided. A port of the USB has a first configuration channel pin and a second configuration channel pin, and the first and second configuration channel pins are disposed on opposite sides. The detection circuit includes a switch unit and a detection unit. The switch unit is coupled to the first and second configuration channel pins to sequentially provide a first voltage level of the first configuration channel pin and a second voltage level of the second configuration channel pin. The detection unit is coupled to the switch unit and correspondingly provides a state reference signal according to the first and second voltage levels.

11 Claims, 2 Drawing Sheets

DETECTION CIRCUIT OF UNIVERSAL SERIAL BUS

CROSS-REFERENCE TO RELATED APPLICATION

This application claims the priority benefit of Taiwan application serial no. 104122791, filed on Jul. 14, 2015. The entirety of the above-mentioned patent application is hereby incorporated by reference herein and made a part of this specification.

BACKGROUND OF THE INVENTION

Field of the Invention

The invention relates to a detection circuit, and more particularly, to a detection circuit of universal serial bus.

Description of Related Art

Universal serial bus (USB) is a serial port bus standard for connecting a computer system to the external devices as well as a technical specification of an input-output interface, which has been widely applied in communication electronic products such as personal computers and mobile devices and served as extended functions for other related electronic products such as photography apparatuses, digital televisions (set-top boxes), game consoles and so on. The type-C port released by the USB organization provides usable functions for reversible connected with the plug of the USB cable. However, a connection state of a connector and a port must be confirmed first before two ends of the line may be connected correctly.

SUMMARY OF THE INVENTION

The invention provides a detection circuit of universal serial bus, which is capable of achieving function of detecting port states simply by using one single circuit in order to reduce overall hardware cost.

In a detection circuit of universal serial bus of the invention, a port of the universal serial bus has a first configuration channel pin and a second configuration channel pin, and the first configuration channel pin and the second configuration channel pin are disposed on opposite sides. The detection circuit includes a switch unit and a detection unit. The switch unit is coupled to the first and second configuration channel pins to sequentially provide a first voltage level of the first configuration channel pin and a second voltage level of the second configuration channel pin. The detection unit is coupled to the switch unit and correspondingly provides a state reference signal according to the first and second voltage levels.

Based on the above, according to the detection circuit of the universal serial bus provided in the embodiments of the invention, the first voltage level of the first configuration channel pin and the second voltage level of the second configuration channel pin may be alternately detected by using one single detect circuit to determine the coupling condition of the port. As a result, the function of state detection may be achieved simply by using one single circuit, so as to reduce overall hardware cost.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
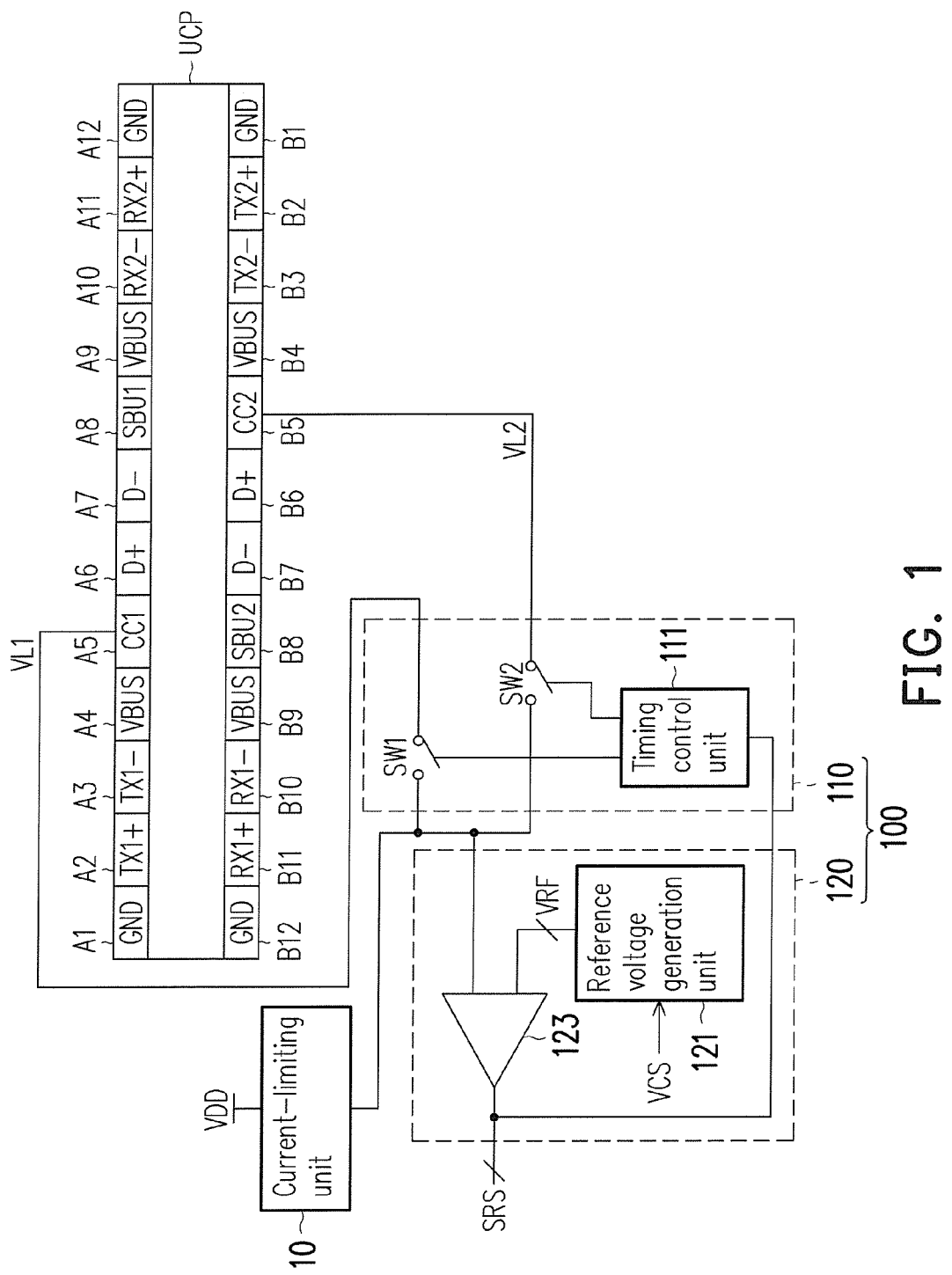
FIG. 1 is a circuit diagram illustrating a detection circuit coupled to a port of the universal serial bus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit diagram illustrating a detection circuit coupled to a port of the universal serial bus according to an embodiment of the invention. Referring to FIG. 1, in the present embodiment, a detection circuit 100 includes a switch unit 110 and a detection unit 120, for example. Further, a port UCP of the universal serial bus has two lines of pins oppositely disposed (e.g., pins A1 to A12 disposed on the top side and pin B1 to B12 disposed on the bottom side), and both the two lines of pins have the same definitions so that the port UCP may be reversible connected with a plug of the USB cable. The definitions of these pins may refer to the USB type-C standard, which are not repeated hereinafter.

Herein, it is assumed that the port UCP is a downstream-facing port (DFP) (i.e., the port UCP is disposed at a host end), such that a system voltage VDD of an electronic apparatus (not illustrated) is provide to a first configuration channel pin CC1 of the port UCP or a second configuration channel pin CC2 of the port UCP through a current-limiting unit 10 and the switch unit 110. Herein, the current-limiting unit 10 may be implemented by using an impedance component (e.g., a resistor) or a current source, but the invention is not limited thereto.

The switch unit 110 is coupled to the first configuration channel pin CC1 of the port UCP, the second configuration channel pin CC2 of the port UCP, the current-limiting unit 10 and the detection unit 120 to sequentially provide current to the first configuration channel pin CC1 and the second configuration channel pin CC2 and sequentially provide a first voltage level VL1 of the first configuration channel pin CC1 and a second voltage level VL2 of the second configuration channel pin CC2 to the detection unit 120.

The detection unit 120 is coupled to the switch unit 110 to sequentially receive the first voltage level VL1 and the second voltage level VL2 and correspondingly provide a state reference signal SRS according to the received first voltage level VL1 and the received second voltage level VL2, so that the electronic apparatus (not illustrated) may determine whether the port UCP is coupled to another electronic apparatus and a type of said another electronic apparatus.

More specifically, the switch unit 110 includes a first switch SW1, a second switch SW2 and a timing control unit 111. The first switch SW1 is coupled between the first configuration channel pin CC1 and the detection unit 120. The second switch SW2 is coupled between the second configuration channel pin CC2 and the detection unit 120. The timing control unit 111 is coupled to the first switch SW1 and the second switch SW2 to control the first switch SW1 and the second switch SW2 to be alternately turned on and off. In other words, the second switch SW2 is turned off when the first switch SW1 is turned on, and the first switch SW1 is turned off when the second switch SW2 is turned on.

The detection unit 120 includes a reference voltage generation unit 121 and a comparator 123. The reference voltage generation unit 121 receives a current setting value VCS in order to provide a plurality of comparison reference voltages VRF, where the current setting value VCS is a maximum rated current value corresponding to the port UCP. The comparator 123 is coupled to the reference voltage generation unit 121 and the switch unit 110 to sequentially receive the first voltage level VL1 and the second voltage level VL2 through the switch unit 110, and provides the state reference signal SRS to the electronic apparatus (not illustrated) according to a comparison result obtained after comparing the first voltage level VL1 with the comparison reference voltages VRF and comparing the second voltage level VL2 with the comparison reference voltages VRF.

In the present embodiment, the timing control unit 111 may receive the state reference signal SRS for determining whether the port UCP is connected to another electronic apparatus, and accordingly determines whether to constantly provide the first voltage level VL1 or the second voltage level VL2 to the detection unit 120 (i.e., to constantly couple the current-limiting unit 10 to the first configuration channel pin CC1 or the second configuration channel pin CC2).

Based on the USB type-C standard, the port UCP may provide the system voltage VDD with three rated currents including 500 mA (which is the default value), 1.5 A and 3 A. Further, when the rated current is 500 mA, the current-limiting unit 10 has a current value set to 80 μA±20% or an impedance value set to 56 kΩ±20%; when the rated current is 1.5 A, the current-limiting unit 10 has the current value set to 180 μA±8% or the impedance value set to 22 kΩ±5%; and when the rated current is 3 A, the current-limiting unit 10 has the current value set to 330 μA±8% or the impedance value set to 10 kΩ±5%.

Further, when a cable of the universal serial bus is connected to the port UCP, the cable of the universal serial bus is connected to one of the first configuration channel pin CC1 and the second configuration channel pin CC2, whereas another one of the first configuration channel pin CC1 and the second configuration channel pin CC2 is connected to a ground voltage through an internal resistance. Based on the USB type-C standard, an impedance value of the internal resistance is 800Ω to 1.2 kΩ.

Figure 2:
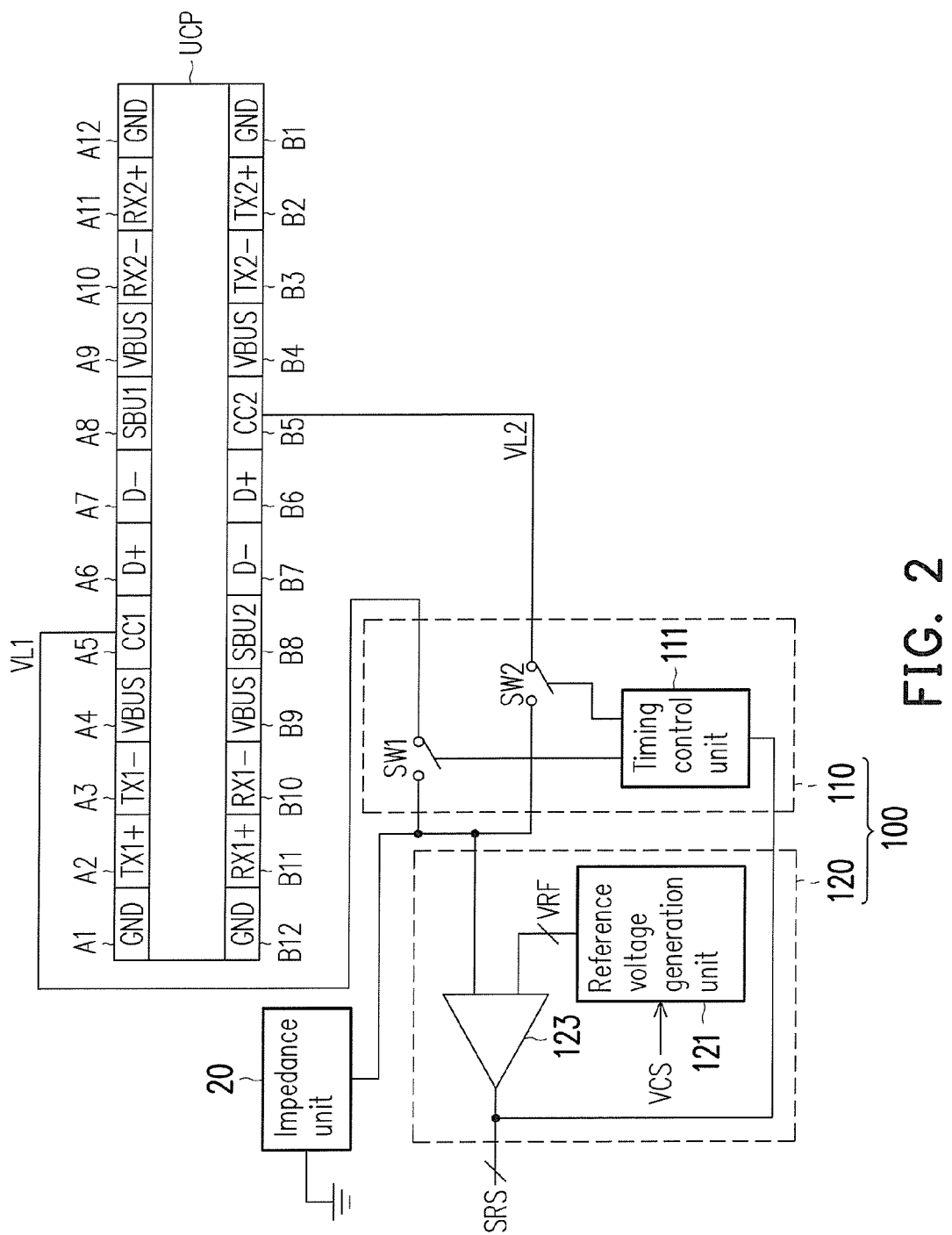
FIG. 2 is a circuit diagram illustrating a detection circuit coupled to a port of the universal serial bus according to another embodiment of the invention.

FIG. 2 is a circuit diagram illustrating a detection circuit coupled to a port of the universal serial bus according to another embodiment of the invention. Referring to FIG. 1 and FIG. 2 together, the same or similar elements therein are indicated by the same or similar reference numbers. Unlike FIG. 1, it is assumed that the port UCP of FIG. 2 is an upstream-facing port (UFP) (i.e., the port UCP is disposed at a device end), such that a ground voltage of an electronic apparatus (not illustrated) is provided to the first configuration channel pin CC1 of the port UCP or the second configuration channel pin CC2 of the port UCP through an impedance unit 20 and the switch unit 110. Herein, the impedance unit 20 may be implemented by using an impedance component (e.g., a resistor), but the invention is not limited thereto. Based on the USB type-C standard, an impedance value of the impedance unit 20 is 5.1 kΩ.

According to the embodiments of FIG. 1 and FIG. 2, it is assumed herein that the port UCP is the downstream-facing port and the rated current thereof is 500 mA. In this case, when the first configuration channel pin CC1 and the second configuration channel pin CC2 are located between the current-limiting unit 10 and the internal resistance of the cable, the first voltage level VL1 and the second voltage level VL2 fall between 0V and 0.15V; when the first configuration channel pin CC1 and the second configuration channel pin CC2 are located between the current-limiting unit 10 and the impedance unit 20, the first voltage level VL1 and the second voltage level VL2 fall between 0.25V and 1.5V; and when the first configuration channel pin CC1 and the second configuration channel pin CC2 are only coupled to the current-limiting unit 10 (i.e., the first configuration channel pin CC1 and the second configuration channel pin CC2 are open-circuit), the first voltage level VL1 and the second voltage level VL2 are greater than 1.65V. According to the above, when the current setting value received by the reference voltage generation unit 121 is 500 mA (i.e., the rated current of the universal serial bus), the comparison reference voltages VRF of 0.2V and 1.6V are generated in order to separate aforesaid three coupling conditions.

In the case where the port UCP is the downstream-facing port and the rated current thereof is 1.5 A, when the first configuration channel pin CC1 and the second configuration channel pin CC2 are located between the current-limiting unit 10 and the internal resistance of the cable, the first voltage level VL1 and the second voltage level VL2 fall between 0V and 0.35V; when the first configuration channel pin CC1 and the second configuration channel pin CC2 are located between the current-limiting unit 10 and the impedance unit 20, the first voltage level VL1 and the second voltage level VL2 fall between 0.45V and 1.5V; and when the first configuration channel pin CC1 and the second configuration channel pin CC2 are only coupled to the current-limiting unit 10 (i.e., the first configuration channel pin CC1 and the second configuration channel pin CC2 are open-circuit), the first voltage level VL1 and the second voltage level VL2 are greater than 1.65V. According to the above, when the current setting value received by the reference voltage generation unit 121 is 1.5 A (i.e., the rated current of the universal serial bus), the comparison reference voltages VRF of 0.4V and 1.6V are generated in order to separate aforesaid three coupling conditions.

In the case where the port UCP is the downstream-facing port and the rated current thereof is 3 A, when the first configuration channel pin CC1 and the second configuration channel pin CC2 are located between the current-limiting unit 10 and the internal resistance of the cable, the first voltage level VL1 and the second voltage level VL2 fall between 0V and 0.75V; when the first configuration channel pin CC1 and the second configuration channel pin CC2 are located between the current-limiting unit 10 and the impedance unit 20, the first voltage level VL1 and the second voltage level VL2 fall between 0.85V and 2.45V; and when the first configuration channel pin CC1 and the second configuration channel pin CC2 are only coupled to the current-limiting unit 10 (i.e., the first configuration channel pin CC1 and the second configuration channel pin CC2 are open-circuit), the first voltage level VL1 and the second voltage level VL2 are greater than 2.75V. According to the above, when the current setting value received by the reference voltage generation unit 121 is 3 A (i.e., the rated current of the universal serial bus), the comparison reference voltages VRF of 0.0.8V and 2.6V are generated in order to separate aforesaid three coupling conditions.

In the case where the port UCP is the upstream-facing port, when the first configuration channel pin CC1 and the second configuration channel pin CC2 are located between the current-limiting unit 10 and the internal resistance of the cable, the first voltage level VL1 and the second voltage level VL2 fall between −0.25V and 0.15V; and when the first configuration channel pin CC1 and the second configuration channel pin CC2 are located between the current-limiting unit 10 and the impedance unit 20, the first voltage level VL1 and the second voltage level VL2 fall between 0.25V and 2.04V. Because the downstream-facing port has the three rated currents, the voltage levels of the first configuration channel pin CC1 and the second configuration channel pin CC2 located between the current-limiting unit 10 and the impedance unit 20 may further be divided into three states: when the rated current of the current-limiting unit 10 is 500 mA, the first voltage level VL1 and the second voltage level VL2 fall between 0.25V to 0.61V; when the rated current of the current-limiting unit 10 is 1.5 A, the first voltage level VL1 and the second voltage level VL2 fall between 0.7V to 1.16V; and when the rated current of the current-limiting unit 10 is 3 A, the first voltage level VL1 and the second voltage level VL2 fall between 1.31V to 2.04V. According to the above, when the current setting value received by the reference voltage generation unit 121 is 0 (i.e., the port is the upstream-facing port), the comparison reference voltages VRF of 0.2V, 0.66V and 1.23V are generated in order to separate aforesaid two coupling conditions and the three rated currents.

According to the foregoing description, when the port UCP is the downstream-facing port and the first configuration channel pin CC1 and the second configuration channel pin CC2 are not coupled to an external element, the electronic apparatus (not illustrated) may be informed of said coupling condition through the state reference signal SRS which indicates that the port UCP is not coupled to the cable; when the port UCP is the downstream-facing port and one of the first configuration channel pin CC1 and the second configuration channel pin CC2 is open-circuit and another of the first configuration channel pin CC1 and the second configuration channel pin CC2 is coupled to the impedance unit 20, the electronic apparatus (not illustrated) may be informed of said coupling condition through the state reference signal SRS which indicates that the port UCP is coupled to another port UCP of the upstream-facing port; when the port UCP is the downstream-facing port and one of the first configuration channel pin CC1 and the second configuration channel pin CC2 is open-circuit and another of the first configuration channel pin CC1 and the second configuration channel pin CC2 is coupled to the internal resistance of the cable, the electronic apparatus (not illustrated) may be informed of said coupling condition through the state reference signal SRS which indicates that the port UCP is connected to the cable but not coupled to another port UCP; when the port UCP is the downstream-facing port and one of the first configuration channel pin CC1 and the second configuration channel pin CC2 is coupled to the impedance unit 20 and another of the first configuration channel pin CC1 and the second configuration channel pin CC2 is coupled to the internal resistance of the cable, the electronic device (not illustrated) may be informed of said coupling condition through the state reference signal SRS which indicates that the port UCP is connected to the cable and coupled to another port UCP of the upstream-facing port; when the port UCP is the downstream-facing port and the first configuration channel pin CC1 and second configuration channel pin CC2 are both coupled to the impedance unit 20, the electronic apparatus (not illustrated) may be informed of said coupling condition through the state reference signal SRS which indicates that the port UCP is coupled to a debug accessory; and when the port UCP is the downstream-facing port and the first configuration channel pin CC1 and second configuration channel pin CC2 are both coupled to the internal resistance of the cable, the electronic apparatus (not illustrated) may be informed of said coupling condition through the state reference signal SRS which indicates that the port UCP is coupled to an audio adaptor accessory.

When the port UCP is the downstream-facing port and coupled to the upstream-facing port, it indicates that one of the first configuration channel pin CC1 and the second configuration channel pin CC2 is effective. Therefore, the switch unit 110 constantly couples the current-limiting unit 10 to the effective first configuration channel pin CC1 or the effective second configuration channel pin CC2 (i.e., conduction states of the first switch SW1 and the second switch SW2 of the switch unit 110 maintain unchanged). Conversely, when the port UCP is the downstream-facing port and not coupled to the upstream-facing port (i.e., the port UCP is open-circuit, coupled to the debug accessory or coupled to the audio adaptor accessory), it indicates that the confirmation for the first configuration channel pin CC1 and the second configuration channel pin CC2 must be sustained. Therefore, the switch unit 110 still alternately couples the current-limiting unit 10 to the first configuration channel pin CC1 and the second configuration channel pin CC2 (i.e., the first switch SW1 and the second switch SW2 of the switch unit 110 are still alternately turned on and off).

When the port UCP is the upstream-facing port and coupled to the downstream-facing port, it indicates that one of the first configuration channel pin CC1 and the second configuration channel pin CC2 is effective. Therefore, the switch unit 110 constantly couples the impedance unit 20 to the effective first configuration channel pin CC1 or the effective second configuration channel pin CC2 (i.e., conduction states of the first switch SW1 and the second switch SW2 of the switch unit 110 maintain unchanged). When the port UCP is the upstream-facing port and not coupled to the downstream-facing port (i.e., the port UCP is open-circuit), it indicates that the confirmation for the first configuration channel pin CC1 and the second configuration channel pin CC2 must be sustained. Therefore, the switch unit 110 still alternately couples the impedance unit 20 to the first configuration channel pin CC1 and the second configuration channel pin CC2 (i.e., the first switch SW1 and the second switch SW2 of the switch unit 110 are still alternately turned on and off).

In the foregoing embodiments, the upstream-facing port and the downstream-facing port are opposite to each other, that is, a synchronized operation of the switch units 110 of the detection circuits 100 at both sides may result in that the connection state cannot be correctly detected. Therefore, on-times of the first switch SW1 and the second switch SW2 of the switch unit 110 may be set to be different from each other over time. Specifically, the on-times of the first switch SW1 and the second switch SW2 may be set by using random numbers, which may be generated by a True RNG or a Pseudo RNG; or, the on-times of the first switch SW1 and the second switch SW2 may be alternately changed between a long time period and a short time period which are different from each other. For example, the long time period may be set to be twice the short time period, which may be determined by persons skilled in the art.

In summary, according to the detection circuit of the universal serial bus provided in the embodiments of the invention, the first voltage level of the first configuration channel pin and the second voltage level of the second configuration channel pin may be alternately detected by using one single detection circuit to determine the coupling condition of the port. As a result, the function of state detection may be achieved simply by using one single circuit, so as to reduce overall hardware cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detection circuit of universal serial bus, a port of the universal serial bus having a first configuration channel pin and a second configuration channel pin, the first configuration channel pin and the second configuration channel pin being disposed on opposite sides, and the detection circuit comprising:
    a switch unit, coupled to the first configuration channel pin and the second configuration channel pin to sequentially provide a first voltage level of the first configuration channel pin and a second voltage level of the second configuration channel pin; and
    a detection unit, coupled to the switch unit and correspondingly providing a state reference signal according to the first voltage level and the second voltage level, wherein the detection unit comprises:
    a reference voltage generation unit, receiving a current setting value in order to provide a plurality of comparison reference voltages; and
    a comparator, coupled to the reference voltage generation unit and the switch unit to sequentially receive the first voltage level and the second voltage level through the switch unit, and providing the state reference signal after comparing the first voltage level with the comparison reference voltages and comparing the second voltage level with the comparison reference voltages.

2. The detection circuit of the universal serial bus of claim 1, wherein the switch unit comprises:
    a first switch, coupled between the first configuration channel pin and the detection unit;
    a second switch, coupled between the second configuration channel pin and the detection unit; and
    a timing control unit, coupled to the first switch and the second switch to control the first switch and the second switch to be alternately turned on and off.

3. The detection circuit of the universal serial bus of claim 2, wherein on-times of the first switch and the second switch are alternately changed between a long time period and a short time period.

4. The detection circuit of the universal serial bus of claim 3, wherein the long time period is twice the short time period.

5. The detection circuit of the universal serial bus of claim 2, wherein on-times of the first switch and the second switch are randomly set.

6. The detection circuit of the universal serial bus of claim 2, wherein conduction states of the first switch and the second switch maintain unchanged when the port is a downstream-facing port and coupled to an upstream-facing port, and the first switch and the second switch are still alternately turned on and off when the port is a downstream-facing port and coupled to an audio adaptor accessory or a debug accessory.

7. The detection circuit of the universal serial bus of claim 2, wherein conduction states of the first switch and the second switch maintain unchanged when the port is an upstream-facing port and coupled to a downstream-facing port.

8. The detection circuit of the universal serial bus of claim 1, wherein the comparison reference voltages are 0.2V, 0.66V and 1.23V when the current setting value is 0.

9. The detection circuit of the universal serial bus of claim 1, wherein the comparison reference voltages are 0.2V and 1.6V when the current setting value is 500 mA.

10. The detection circuit of the universal serial bus of claim 1, wherein the comparison reference voltages are 0.4V and 1.6V when the current setting value is 1.5 A.

11. The detection circuit of the universal serial bus of claim 1, wherein the comparison reference voltages are 0.8V and 2.6V when the current setting value is 3 A.

* * * * *